US006654781B1

(12) United States Patent
Browning

(10) Patent No.: US 6,654,781 B1
(45) Date of Patent: Nov. 25, 2003

(54) ENHANCED THREAD PROCESSING

(75) Inventor: Luke Matthew Browning, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,095

(22) Filed: Dec. 11, 1998

(51) Int. Cl.[7] ................................................ G06F 9/00
(52) U.S. Cl. ....................... 709/104; 711/147; 711/153; 711/170; 711/173
(58) Field of Search .............. 711/6, 100–173; 709/104, 100–108

(56) References Cited

U.S. PATENT DOCUMENTS

| | | | | |
|---|---|---|---|---|
| 5,515,538 A | * | 5/1996 | Kleiman | 710/260 |
| 5,717,926 A | * | 2/1998 | Browning et al. | 709/104 |
| 5,950,221 A | * | 9/1999 | Draves et al. | 711/100 |
| 6,349,355 B1 | * | 2/2002 | Draves et al. | 711/6 |

OTHER PUBLICATIONS

AIX Version 4.3 Kernel Extensions and Device Support programming Concepts International Business Machines Corporation Oct. 1997 First Edition pp. 1–94.*

* cited by examiner

Primary Examiner—St. John Courtenay, III
Assistant Examiner—Charles E. Anya
(74) Attorney, Agent, or Firm—Thomas E. Tyson; Edmond A. DeFrank

(57) ABSTRACT

A method and implementing computer system is provided for the creation of large numbers of threads in a computer system. An exemplary embodiment supports up to sixteen segments in memory of thread private data for each process or application program running on the system. Each segment contains support for 2K threads. These segments are identified in process' user structure which is located in the process private data segment of memory allowing cleanup collection on a per-segment basis. The thread's private data is composed of two parts, viz. its private kernel thread stack (96K) and uthread data structure. The uthread contains the individual data fields that are referenced only by the thread, including the register save area for the thread.

10 Claims, 2 Drawing Sheets

ENHANCED THREAD PROCESSING

FIELD OF THE INVENTION

The present invention relates generally to information processing systems and more particularly to a methodology and implementation for providing an increased number of threads in a process.

BACKGROUND OF THE INVENTION

UNIX-based operating systems schedule execution of various user processes on one or more microprocessors within the computing system. A user process includes a set of system resources for executing one or more "threads". A thread is a simple execution path through application software and the operating system. Stated differently, a thread is a separate sequential flow of control that takes place during the execution of a data processing program or application. A thread may also be described as the active execution of a designated data processing routine, including any nested routine invocations. Kernels or kernel threads are control flows which enable concurrent processing of a procedure by a plurality of processors thereby dividing a task to be performed into parts and decreasing the task execution time. Multi-threading can be used in single processor systems to perform several tasks at the same time such as input monitoring and computation execution. Multi-threading can also be used in multi-processor systems to perform several control flows or threads in parallel.

In order to maintain data integrity while multiple threads are running in parallel and manipulating common data, such systems have in the past required highly sophisticated management systems for data tracking. In the past, if an application sought to exceed a common 513 thread limit, it had to be spaced out over multiple processes which creates a problem because the user thread programming model didn't support multiple processes accessing the same data structures. Application developers have been forced to develop their own non-portable kernel extensions to bridge the gap between the processes, which is an extremely difficult programming task, because the internals of the thread programming model are mostly hidden from third party developers. For example, simply referencing global memory can become difficult if applications are allowed to map shared memory at different locations or through mapped files.

Thus, there is a need for an improved methodology and implementing system which enables a simpler application programming model, having improved application scalability, which allows more concurrent input/output throughput and greater application portability.

SUMMARY OF THE INVENTION

A method and implementing computer system is provided for the creation of large numbers of threads in a computer system. An exemplary embodiment supports up to sixteen segments in memory of thread private data for each process or application program running on the system. Each segment contains support for 2K threads. These segments are identified in process' user structure which is located in the process private data segment of memory allowing cleanup collection on a per-segment basis. The thread's private data is composed of two parts, viz. its private kernel thread stack (96K) and uthread data structure. The uthread contains the individual data fields that are referenced only by the thread, including the register save area for the thread.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
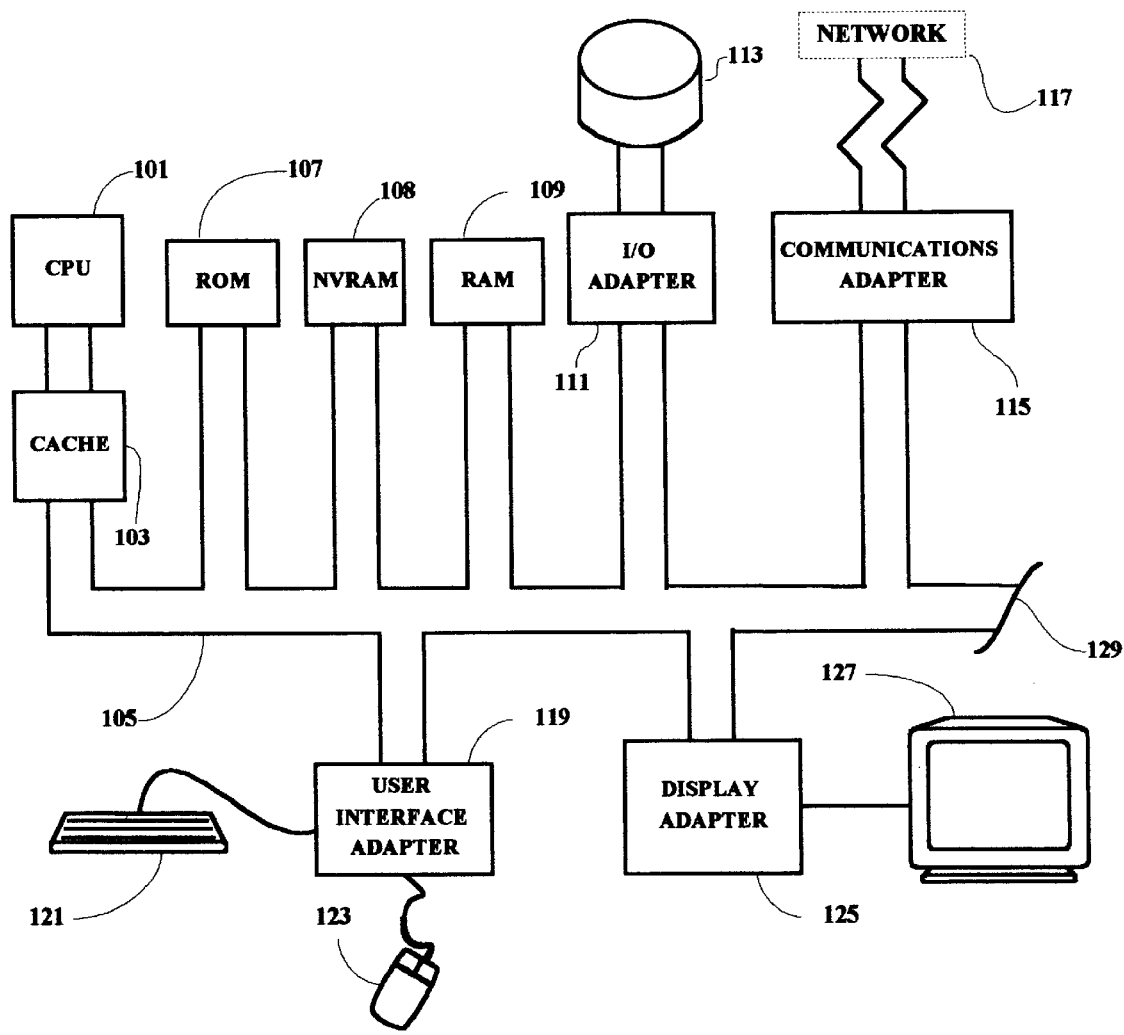
FIG. 1 is a diagram of a computer system in which the present invention may be implemented.

The present invention may be practiced in any suitable hardware configuration such as the workstation system illustrated in FIG. 1 or, alternatively, in a laptop or so called "network" computer. In the exemplary embodiment illustrated in FIG. 1, a workstation includes at least one CPU (central processing unit) which is coupled through a cache memory 103 to a system bus 105. The bus 105 is also coupled to a ROM (Read Only Memory) device 107, an NVRAM (non-volatile Random Access Memory) device 108, and a RAM (Random Access Memory) device 109. An I/O (input/output) adapter 111 is arranged to connect the system 105 bus to peripheral devices such as a disk or tape drive device 113. The system bus 105 is also coupled through a communications adapter 115 to a network 117, and through a user interface adapter 119 to various input devices such as a keyboard 121 and a mouse or pointing device 123. The illustrated workstation also includes a display adapter 125 and a display device 127 which are coupled to the system bus 105. The display device 127 may be any suitable display such as a CRT or flat panel display. The system 105 bus may also be extended 129 to be connected to other systems through bus bridge circuits or other networks (not shown).

In general, an implementing computer system may include a plurality of processors in a multi-bus system in a network of similar systems. However, since the workstation or computer system implementing the present invention in an exemplary embodiment, is generally known in the art and composed of electronic components and circuits which are also generally known to those skilled in the art, the computer system details beyond those shown in FIG. 1 are not specified to any greater extent than that considered necessary as illustrated, for the understanding and appreciation of the underlying concepts of the present invention and in order not to obfuscate or distract from the teachings of the present invention.

The present invention relates to a methodology for the creation of large numbers of so called "threads". The methodology is generally described in the listed pseudocode which is explained following a present brief discussion of some of the terms referred to in the description of the invention. As hereinbefore noted, conventional UNIX-based operating systems schedule execution of various user processes or software applications on one or more microprocessors within a computing system or workstation such as the workstation illustrated in FIG. 1. A user process includes a set of system resources for executing one or more "threads". A thread is an independent flow of control that operates within the same address space as other independent flows of controls within a process. In most UNIX systems, thread and process characteristics are grouped into a single entity called a process. In other operating systems, threads are sometimes called "lightweight processes".

In traditional single threaded process systems, a process has a set of properties. In multi-threaded systems, those properties are divided between processes and threads. The process must be considered as an execution frame. It has all traditional process attributes such as Process ID, process group ID, user ID, group ID, environment and working directory. A process also provides a common address space and common system resources including file descriptors, signal actions, shared libraries, and inter-process communication tools such as message queues and shared memory. A thread is a schedulable entity. A thread has only those properties that are required to ensure its independent flow of control such as stack, priority, a set of pending and blocked signals and thread-specific data. An example of thread-specific data is the error indicator ERRNO. In multi-threaded systems, ERRNO is no longer a global variable, but usually a subroutine returning a thread-specific ERRNO value. Threads within a process must not be considered as a group of processes. All threads share the same address space. This means that two pointers having the same value in two threads refer to the same data. Also if any thread changes one of the shared system resources, all threads within the process are affected. Foe example, if a thread closes a file, the file is closed for all threads.

When a process is created, one thread is automatically created. That thread is called the initial thread. The initial thread insures the compatibility between the old process with a unique implicit thread and the new multi-threaded process. The initial thread has some special properties, not visible to the programmer, that ensure binary compatibility between the old single-threaded programs and the multi-threaded operating system. It is also the initial thread that executes the main routine in multi-threaded programs.

A thread is a schedulable entity i.e. the system scheduler handles threads. These threads known by the system scheduler, are strongly implementation-dependent. To facilitate the writing of portable programs, libraries provide another kind of thread.

A kernel thread is a kernel entity, like processes and interrupt handlers; it is the entity handled by the system scheduler. A kernel thread runs within a process, but can be referenced by any other thread in the system. The programmer has no direct control over kernel threads unless writing kernel extensions or device drivers.

A user thread is an entity used by programmers to handle multiple flows of controls within a program. The API (application program interface) for handling user threads is provided by a library, i.e. the threads library. A user thread only exists within a process. A User thread in process A cannot reference a user thread in process B. The library uses a proprietary interface to handle kernel threads for executing user threads. The user thread's API, unlike the kernel thread's interface, is part of a portable programming model. Thus a multi-threaded program developed on one system can easily be ported to other systems.

Each kernel thread has its own kernel stack for executing system calls and kernel services on behalf of its associated user thread. The kernel stack contains the kernel thread's current processing information, such as automatic variables, hardware registers and a back-link pointer to the previous stack frame. A stack frame is allocated for each subroutine that is called. The stack frame contains the return address for the current subroutine, which allows the execution stream to return along the same path from which it came. Each stack frame also contains memory for the automatic variables used by the subroutine. Theses variables are called automatic since the programmer doesn't need to allocate memory for them. The compiler calculates the size of each stack frame based on the memory requirements of each subroutine.

A thread's kernel stack must be large enough to facilitate complicated system calls, which may have nested subroutine calls. In an exemplary embodiment, each thread's stack is 98,304 (96K) bytes in length, which, by itself, does not pose a problem. However, when it is multiplied by a large number of threads such as 32,768 (32K), it does pose a problem. The entire real memory range could be allocated to kernel stacks, but that is not practical since the operating system also needs to be present.

Further, it is not practical to allocate all of the remaining space to kernel stacks since each system call may reference user data. User data is not automatically included within the kernel address space as a system call is executed. Each system call must explicitly map the user data that the system call needs. The system call should not have to un-map kernel stacks in order to achieve user data mapping.

Moreover there is a hidden cost with the mapping and un-mapping of memory in general. Various hardware registers need to be updated, which includes an expensive memory protocol on multi-processor systems. It is best to work with as few memory segments attached as possible. This goal is to achieved by the present invention which maps only the kernel thread's private data that is used by the executing thread.

Each thread has a dedicated uthread and kernel stack. These two items are examples of kernel thread private data. The kernel stack contains the information necessary to complete the current system call. The uthread structure contains a hardware register save area that is used by the operating system to hold the register state of the thread when it is not running. Thread private data is almost always only referenced by the thread that owns the data.

On the few occasions when thread private data is referenced by another thread, the data must be explicitly mapped. By default, the operating system only maps the thread private data for the current thread. This leads to a more complicated programming model in the kernel, but allows large numbers of threads within a single process.

Figure 2:
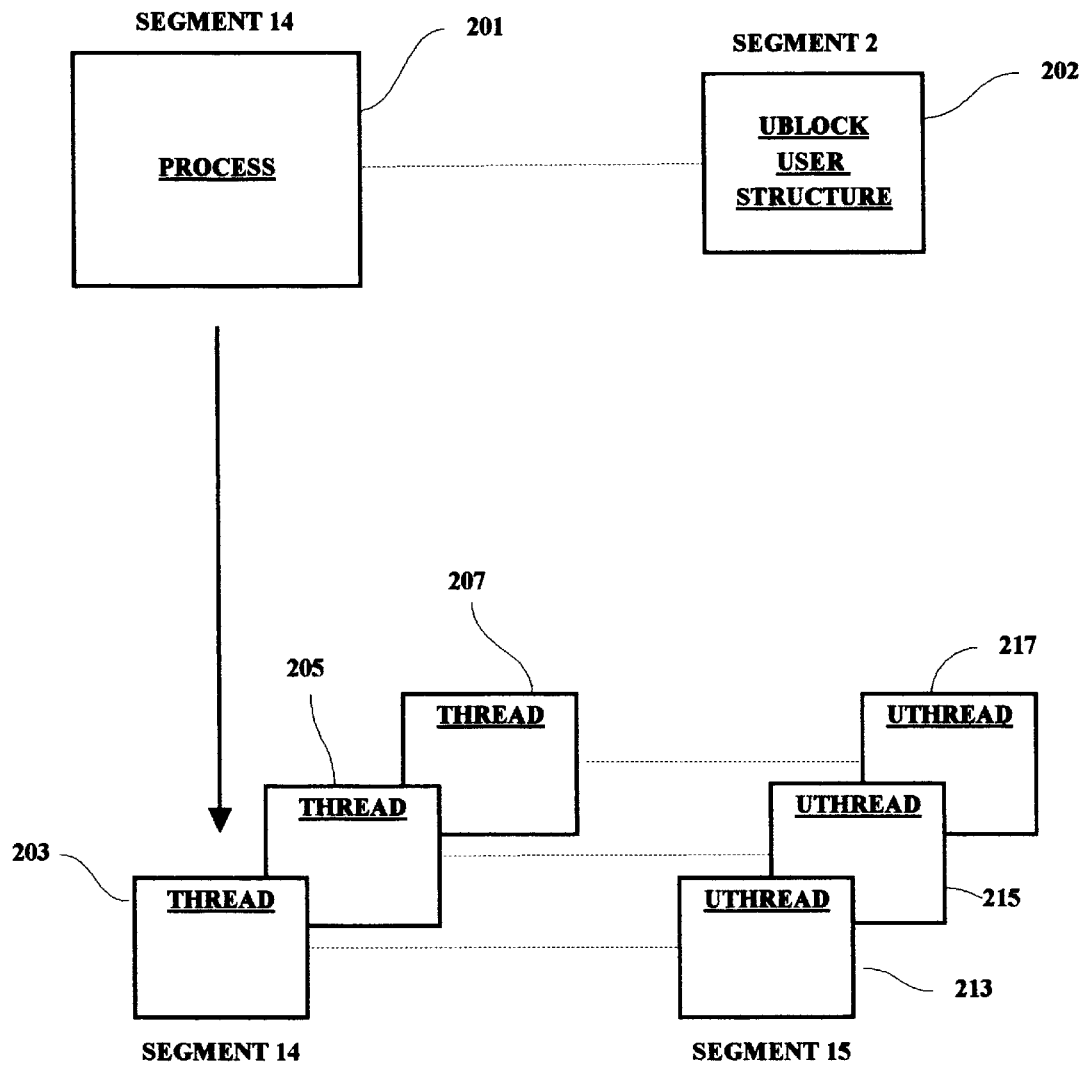
FIG. 2 is a diagram illustrating segment mapping in accordance with the present invention.

The present invention is achieved through the careful separation of thread private data and shared data as schematically shown in FIG. 2. In FIG. 2, the four major data structures that constitute a process are illustrated. Provided with each structure is a segment identifier, which dictates the rules for referencing the data structure. It is necessary to carefully partition the data in order to minimize the memory footprint of the thread. Each process has a single process structure 201 that contains information shared by each of the threads in the process such as its process ID and user ID. Each process also contains at least one thread structure. In the example, three thread structures 203, 205 and 207 are shown. Each thread structure contains information that is associated with a thread, such as its thread ID or execution state. The process and thread structures are themse lves elements in tables which are located in the Kernel Extension Segment. That segment can be referenced at any time by any thread or even by an interrupt handler, provided that it is referenced in kernel mode. Segment register 14 is always loaded with the segment ID associated with the Kernel Extension Segment while in kernel mode.

Each process has a single ublock or user structure 202 which is similar to the process structure in that it contains data that is shared by each of the threads in the process. However, it is not located in a globally visible segment. It is referenced through segment register 2 which is loaded with a value that is unique to the process. Each thread in the process has the same segment register 2 value, and thus sees the same data. The ublock is not generally visible outside the process. The ublock contains information that is shared at the process level but which does not need to be referenced outside the process. For example, the ublock contains the open file information.

Each thread has a dedicated uthread. For example, in FIG. 2, uthread is associated with thread, uthread is associated with thread and uthread 217 is associated with thread 207. The uthread structure contains the register save area for its dedicated thread and its kernel stack. This information is generally only referenced under the context of the thread. When a thread is executing, this data is referenced through segment register 15.

To summarize segment usage, every thread in the system has the same segment register 14. Every thread in a process has the same segment register 2, which is different for each process. Each thread in the system may have a different segment register 15, although in an exemplary embodiment, each segment 15 supports 2048 threads in the same process. A salient feature of the invention is that the thread private data has been placed in a special segment, which is generally only visible to an executing thread. In an exemplary embodiment, there may be up to 16 of those segments for each process, yielding 32768 threads per process, since each segment can support up to 2048 threads.

With the disclosed methodology, in some cases it is necessary to reference the thread private data of another thread in the same process. For example, when creating a thread, it is necessary to update the save area in the uthread or to copy data on to its kernel stack. In those cases it is necessary to explicitly attach to the target thread's private data segment, the value that is loaded into segment register 15 when it is executing, to make an assignment.

Thus, in accordance with the present invention, a thread's private data can only be referenced under the context of the running thread after it has been created. A thread's private data is contained within a single memory segment, which is then mapped at a fixed location whenever the kernel is entered. It is re-mapped at context switch time so that the newly running thread can reference its own data. The thread specific segment is named in the thread's structure, which contains its private data and is mapped at a fixed location.

The disclosed methodology and exemplary software embodiment for the creation of large numbers of threads in a computer system supports up to sixteen segments in memory of thread private data for each process or application program running on the system. Each segment contains support for 2K threads. These segments are identified in process' user structure which is located in the process private data segment of memory allowing cleanup collection on a per-segment basis. The thread's private data is composed of two parts, viz. its private kernel thread stack (96K) and uthread data structure. The uthread contains the individual data fields that are referenced only by the thread after it has been created, including the register save area for the thread.

When the kernel is running, the following segments are mapped: kernel segment 0: global kernel segment-drivers and first heap; kernel segment 1: global kernel segment-second heap; process private segment 2: user structure; kernel segment 14: global thread and process structures; and thread private segment 15: uthread and thread kernel stack. The kernel maps 1 of 16 thread private segments in segment 15 based on the identity of the current running thread.

One exemplary pseudocode listing which may be used to implement the present invention is set forth below.

```
THREAD_CREATE()
/*
 * The following two fields in user structure are used to keep
 * track of the active thread private segments.
 *
 *     U.U_num_kstack_segs = number of kernel-thread stack
 *         segments that are allocated.
 *     U.U_kstack_segs[16] = array with 16 elements, each element
 *         names the segment id of a segment
 *         that has been allocated for kernel
 *         thread-stacks in this process.
 */
t = current_thread;
/*
 * Allocate the kernel stack segment for user processes if it does not
 * already exist. The primary thread starts out with its kernel
 * stack and uthread structure in the process private segment. On its
 * first attempt to create a new thread, the calling thread's kernel
 * stack and uthread structure are moved to the newly created kernel-
 * thread segment. The process is single threaded when this occurs.
 */
if (t->t_kthreadseg == NULLSEGVAL) {
    /*
     * The process is single threaded.
     *
     * Sixteen kernel segments are arbitrarily supported in
     * this example although many more could be supported.
     * Each kernel-thread segment supports 2048 kthreads. This routine
     * will traverse reference each segment until it finds one that
     * it has a free slot. If it doesn't find a free slot in any
     * of the previously created segments, it will allocate a new
     * segment and record its segment id in a table that
     * is maintained in the user structure. The table has 16
     * elements. It will return an error if 16 segments have
     * already been allocated and there are no free slots.
     */
    ut = allocate_uthread(&table_index);
    if (ut == NULL)
        return(-1);    /* no uthreads - error return */
    /*
     * Identify segment id where stack and uthread are located.
     * This field is used in the system call handler, when
     * entering the kernel.
     */
    t->t_kthreadseg = U.U_kstack_segs[table_index];
    /*
     * change uthread structures. Must vm_att to the new
     * uthread segment when copying the data from the old
     * segment to the new one. See below for example of
     * vm_att.
     */
    swap_uthread(t, ut);
    /*
     * Change the kernel stack for the current thread. This
     * takes effect on the next system call. Hereafter, the
     * default kernel stack and uthread structures are used
     * as the special fork stack. See the other fork patent
     * for special fork stack.
     */
    t->t_uthreadp->ut_kstack = UT_KSTACK_ADDR(ut);
}
/* Allocate new thread structure and initialize it */
nt = newthread();
if (nt == NULL)
    return(-1);    /* Ran out of thread structures -error return*/
/* Allocate new uthread structure and initialize it */
ut = uthread_alloc(&table_index);
if (ut = NULL) {
    /*
     * Free the allocated thread, we aren't going to use it,
     * since we couldn't get a uthread.
     */
    freethread(nt);
    return(-1);    /* no uthreads - error return */
}
/*
 * The following three
 * fields provide the necessary information to the system call
 * handler to map the kernel environment for this thread.
```

-continued

```
*   t_kthreadseg - identifies the instance of the kernel thread
*      stack segment that should be loaded into segment
*      register 15.
*   t_uthreadp - identifies the offset of the uthread structure
*      in the kernel thread stack segment. The uthread
*      structure holds the hardware register save area
*      for the kernel thread. The system saves the
*      computational state of the kernel thread in this
*      location when it is not running. For example,
*      this allows the kernel thread to be stopped
*      and resumed across hardware interrupts.
*   ut_kstack - offset in the kernel stack segment for this
*      threads kernel stack. This is loaded into general
*      purpose register 1 when entering kernel mode.
*
*   t_uthreadp contains the address of the thread's uthread structure,
*   which may not be unique. It is unique when coupled with
*   t_kthreadseg which contains segment ID of the thread's designated
*   thread segment.
*/
nt->t_kthreadseg = U.U_pm_segs[table_index];
nt->t_uthreadp = ut;
/*
 * Must attach because uthread is in kernel thread stack segment,
 * which is not automatically attached. It is not our uthread.
 */
ut = vm_att(nt->t_kthreadseg, ut);
ut->ut_kstack = UT_KSTACK_ADDR(ut);
vm_det(ut);
/* Return thread id of newly created thread */
return(nt->t_tid);
}
/*
 * A record is kept of an array of segment ids, which
 * need to be individually attached in order
 * to be referenced. Generally a thread is only allowed to reference
 * its own uthread without explicitly attaching, but in this routine
 * an allocation of a uthread for another thread is sought. Therefore,
 * attachment is necessary. This attaching and detaching is required
 * for increasing the number of threads in the process.
 */
UTHREAD_ALLOC(int table_index)
{
  /* For each segment previously allocated */
  for i=0 to U.U_num_kstack_segs-1
  {
    /*
     * Each segment needs to be loaded in order to reference
     * it. The uthread control block, describing the state
     * of uthreads in this segment is located at a fixed address
     * in the segment.
     */
    uthread_cb = vm_att(U.U_kstack_segs[i],
        UTHREAD_CB_ADDR);
    /* Try to allocate an entry from table */
    offset = pm_alloc(uthread_cb);
    /* unload segment - not addressable anymore */
    vm_det(uthread_cb);
    /* A free entry is found: break out of loop */
    if (offset ! = NULL)
      break;
  }
  /*
   * If a free uthread is not found, and the maximum number
   * of segments is not allocated, then allocate a segment
   * and initialize it.
   */
  if((offset == NULL) && (i < MAX_NUMBER_SEGMENTS-1)) {
    /*
     * Record new segment in ublock for the process
     */
    U.U_kstack_segs[i] = create_new_segment();
    U.U_num_kstack_segs++;
    /*
     * Attach the segment so that the memory in it can be
     * referenced. UTHREAD_CB_ADDR is the offset in
     * segment to the uthread control block structure.
     */
    uthread_cb = vm_att(U.U_kstack_segs[i],
        UTHREAD_CB_OFFSET);
    /*
     * The array of uthreads is an instance of a memory zone,
     * which is managed through a set of routines that allocate
     * and free individual elements. Zones also have routines
     * for initializing and releasing zones. The zone below is
     * initialized and then an entry is allocated from it.
     *
     * To initialize a zone, the size of each element needs to be specified,
     * along with the maximum number of elements, and the
     * starting location of the table. Internally, a free
     * list of entries is also maintained.
     */
    pm_init(uthread_cb sizeof(uthread), 2K,
        UTHREAD_ARRAY_OFFSSET);
    /* Try to allocate an entry from table */
    offset = pm_alloc(uthread_cb);
    vm_det(uthread_cb);
  }
  /*
   * Return the offset in the segment of the newly allocated uthread
   * or NULL. NULL signifies that a uthread was not allocated.
   * UTHREAD_CB_OFFSET is equal to NULL, which guarantees that the
   *  offset of an element is non-NULL. UTHREAD_ARRAY_OFFSET
   *  begins after the memory zone cb.
   */
  if(offset !=NULL)
    offset = offset + BASE_SEGMENT15;
  return(offset);
}
/*
 * The kernel thread stack segment does not need to be attached because it
 * is automatically loaded by the system when kernel mode is entered. This
 * is done in the system call handler in the following manner.
 */
```

SYSTEM CALL HANDLER disable interrupts—which creates a critical section that that is guaranteed to run through to completion. It won't be interrupted.

store a few registers into this processor's save area. This gives us a few scratch registers to use when processing the system call. When exiting the system call and returning to the application, we re-load these registers. One of these registers (link) is the address of the instruction in the application to resume.

Also we don't need to save user segment registers since we have a list of them in the user sructure.

By convention the following is loaded:
  segment registers (sr):
    sr0—always loaded
    sr1—global kernel segment.
  sr2—segment id for the user structure. Obtained from the process structure—curthread→t_procp→p_adspace;
    sr14—global kernel segment containing the thread and process tables.
    sr15—kernel thread stack segment. Obtained from the thread structure—curthread→t_kthreadseg;
  general purpose registers (gpr)
    r1—kernel stack pointer—curthread→t_uthreadp→ut_kstack;
    r25—curthread—special purpose register that is set by the kernel dispatcher when context switching kernel threads.
    r26—uthread or save area-curthread→t_uthreadp
  global variables used by system call handler:
    per processor data area (ppda), kernel_seg1, kcrnel_seg14

Psuedo code to implement the above follows:
```
    disable_interrupts;
    store gpr25—gpr26 registers in ppda;
    store link register in per process save area;
    load gpr25 kernel_seg1;
    store gpr25 srl;
    load gpr25 kernel_seg14;
    store gpr25 sr14;
    load gpr25 curthread;
    load gpr26 gpr25→t_procp;
    load gpr26 gpr26→p_adspace;
    store gpr26 sr2;
    load gpr26 gpr→t_uthreadp;
    load gpr1 gpr26→ut_kstack;
    enable_interrupts;
    branch to sub—system specific system call;
    system call specific code is executed here;
    return from sub—system specific system call;
    disable_interrupts;
    load user segment registers from user structure, which
        is located at a fixed address in kernel segment 2.
    load gpr25—gpr26 from save area;
    load link register;
    enable_nterrupts;
    return to application.
```

The method and apparatus of the present invention has been described in connection with a preferred embodiment as disclosed herein. The disclosed methodology may be implemented in a wide range of sequences to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into an operating system, a processor or CPU, or other larger system integrated circuit or chip. The disclosed methodology may also be implemented solely in program code stored on a disk or diskette (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for managing threads of a computer system by allocating its resources, said method comprising:
    creating a new kernel thread segment;
    moving a calling thread's kernel stack and uthread structure to said new kernel thread segment;
    separating the kernel stack and the uthread structure from shared data between threads; and
    locating the kernel stack and uthread structure into an overlaid segment as the calling thread is executing.

2. The method as set forth in claim 1 wherein after changing said kernel stack, said method further including:
    allocating a uthread structure; and
    initializing said uthread structure.

3. The method as set forth in claim 2 and after initializing, said method further including:
    allocating a new uthread structure; and
    initializing said new uthread structure.

4. The method as set forth in claim 1 and further including:
    identifying an instance of said kernel thread segment to be loaded into a segment register;
    identifying an offset of said uthread structure in a kernel thread stack segment; and
    offsetting in said kernel stack segment for said thread's kernel stack.

5. The method as set forth in claim 4 and further including:
    attaching said uthread to said kernel stack segment.

6. The method as set forth in claim 5 and further including:
    returning a thread ID of said newly created thread.

7. A method for managing threads of a computer system, said method comprising:
    creating a new thread having a kernel stack and a uthread structure as context management data; and
    placing context management data that is private to the new thread in a dedicated segment that is not accessible to other threads during execution of the other threads.

8. A method for processing threads in a computer system, said method comprising:
    placing a kernel stack and a uthread structure in a dedicated segment that is not accessible to other threads during execution of the other threads;
    dispatching a thread in kernel mode; and
    loading the dedicated segment of the thread into kernel address space of the thread so that it has access to the kernel stack and the uthread structure.

9. The method as set forth in claim 8 further including loading the dedicated segment into a fixed position in the kernel address space of the kernel thread when the thread is dispatched so that each kernel thread has its own kernel stack and uthread structure and does not have access to another thread's kernel stack and uthread structure.

10. The method as set forth in claim 9 and further including sequentially overlaying an infinite amount of dedicated segments at a same position within the kernel address space.

* * * * *